Feb. 21, 1961  M. J. GILL  2,972,271
PREDETERMINED TORQUE RELEASE HAND TOOL
Filed Nov. 27, 1959
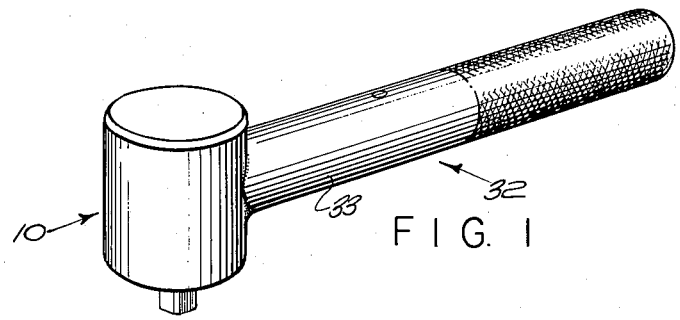
FIG. 1
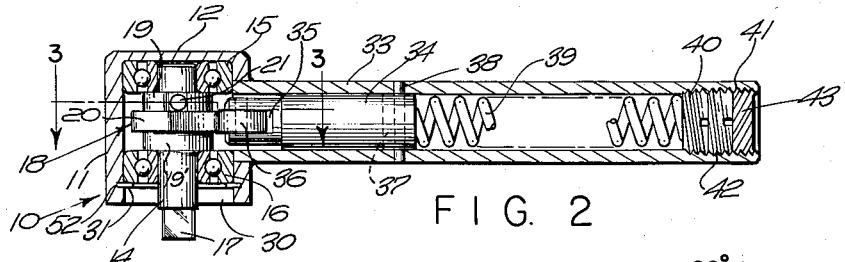
FIG. 2
FIG. 3
FIG. 4
INVENTOR.
MARTIN J. GILL
BY
*Barlow & Barlow*
ATTORNEYS

United States Patent Office 2,972,271
Patented Feb. 21, 1961

2,972,271

PREDETERMINED TORQUE RELEASE HAND TOOL

Martin J. Gill, Attleboro, Mass., assignor to Apco Mossberg Company, a corporation of Massachusetts Filed Nov. 27, 1959, Ser. No. 855,608

7 Claims. (Cl. 81—52.4)

This invention relates to a torque tool of the type which may be preset as to release upon application of a predetermined amount of torque.

One of the objects of this invention is to provide a torque tool in which the release upon the application of torque in one direction will be different from the release when the torque is applied in the opposite direction.

Another object of this invention is to provide a torque tool such that when release does occur, there will be no kickback to loosen the work to which the torque has been applied.

A more specific object of this invention is to provide a loose connection between the application of torque and the work so that when a predetermined release occurs, there will be sufficient play so that no back turning of the work will occur.

With these and other objects in view the invention consists of certain novel features of construction as will be more fully described and particularly pointed out in the appended claims.

In the accompanying drawings;

Figure 1 is a perspective view of one form of torque tool equipped with this invention;

Figure 2 is a central sectional view of the tool;

Figure 3 is a section on line 3—3 of Fig. 2 showing a fragmental portion of the tool;

Figure 4 is a perspective view of a modified arrangement of tool.

In proceeding with this invention, I provide two relatively rotatable members with means attached to one of the members for engaging the work and a means attached to the other member for manually turning the same. Torque is transmitted througa a plunger pressing against a cam so that when turning occurs in one direction a member will be rotated up until a sufficient resistance occurs and then the plunger pressing against the cam will slip on the cam, so that relative rotation occurs without both of the members being turned together, and by an arrangement of the cam surface, I may cause the torque applied in one direction to be different from the torque applied in the other direction at the instant that the slipping along the cam occurs. Also by providing a loose fit between the cam and the member upon which it is mounted, I may prevent a reverse movement of the work when slipping by the cam surface occurs.

With reference to the drawings 10 designates a cylindrical body member which in the present instance is of an inverted cup-shape as shown in Figure 2 having axially extending walls 11 and a laterally extending or end wall 12. A shaft member 14 is mounted by ball bearings 15 and 16 co-axially with the axis of the cylindrical member 10 so as to have free rotation within this cylindrical member 10. The shaft is squared as at 17 to provide a means for engaging the work. A cam unit 18 is provided with a hub 19 and 19' on either side of the cam portion 20 and has a bore such that it may receive the shaft 14. The unit 18 is mounted on this shaft between the two ball bearings 15 and 16. A pin 21 extends laterally through the shaft and slots 22 in hub 19 receive this pin so that the cam can rotate only a limited amount with reference to the shaft before the pin engages the sides of the slot.

The pin 21 extends diametrically across the shaft 14 and the slots 22 are provided of a width substantially greater than the diameter of the pin 21. In the embodiment shown in Figure 3, the edges 23 and 24 of the slots are shown engaging the pin so that when the cam is being turned clockwise, it is engaged by the pin 21 so as to turn the shaft 14 clockwise. However, the opposite edges of the slots 22 designated 25 and 26 which would engage the pin 21 if the cam were turned in the counterclockwise direction are located so that there is a space between the pin 21 and these edges as shown in Figure 3, and the distance of this space is illustrated by the center lines of the pin in the two positions designated 27 and 28 as being 20° apart. The assembly of pin, ball bearings and cam is had through the open end 30 of the cylindrical member 10 and the assembly is held in position by the spring washer 31 lodging in slot 52 in the inner wall 11 of the cylindrical member 10.

A handle designated generally 32 comprises a tubular member 33 extending radially from the cylindrical member 10 with its axis in substantially the plane of the center of the cam and within this handle there is guided a solid plunger 34 which is slotted at its end 35 and carries a roller 36 which engages the cam 20. This plunger is also slotted at its other end as at 37 and receives a pin 38 through the tubular handle and through this slot so as to maintain the plunger against movement around the axis of the handle, thus aligning the roller with the cam surface 20. A spring 39 forces this plunger toward the cam. The tension of this spring is adjusted by means of the screw 40 having threaded engagement with the internal threads 41 at the outer end of the handle. A set screw 42 backs up the adjusting screw 40 both of which may be set by a screwdriver and a plastic seal 43 is inserted at the end of the handle so as to seal the adjustment.

The cam 20 has a plurality of surfaces 45 symmetrically arranged about the axis of the shaft 14 within body member 10. The surfaces are broad and substantially the axial dimension of the roller 36 which engages them. However, the cam surfaces 45 have a gradually sloping portion 46 in one direction and a more abruptly sloping surface 47 in the other direction as may be seen in Figure 3. Thus a motion of the handle 32 in the direction of arrow 48 will move the roller 36 more gradually outwardly and will permit it to snap over the high point 49 on the cam with less pressure on the handle than if the handle and roller 36 are moved in the direction of the arrow 50 in Figure 3 up the steeper surface 47 before it is snapped over the high point 49 of the cam. Thus the torque tool will release upon application of less pressure, such as foot pounds, when the handle 32 is moved in a clockwise direction than when the handle is moved in a counterclockwise direction and this is found advantageous where a release is desired which may be more difficult due to corrosion although the pressure applied is desired to be limited to a lesser amount in the setting up of the screw or nut or bolt with which the tool engages.

In some cases instead of having a torque tool as shown in Figures 1, 2 and 3, the shaft 14 may be extended a greater length and housed in a tubing 51 extending from the cylindrical member 10 with its work engaging end 17' extending therefrom, as shown in Figure 4. In this case the handle 32 may be duplicated diametrically opposite the cylindrical member 10 as at 32' to engage another surface of the cam. In this event the cam must be symmetrical about a diameter in order that both surfaces engaged will be similarly engaged at the same time.

I claim:
1. In a predetermined torque release hand tool, a pair of relatively rotary co-axial members, one of said members being provided with work engaging means, the other of said members being provided with means for manually rotating the member about the common axis of said members, a cam on said common axis, interlocking means between said cam and one member for transmitting rotation of the cam to said member, and a spring pressed plunger slidably mounted with reference to the other member and engageable with the cam surface to rotate the cam, said cam providing a surface gradually sloping in one direction and more abruptly sloping in the other direction for engagement by said plunger whereby for a predetermined torque the plunger will slide against its spring bias without rotating the cam, upon movement of the manual rotating means in either direction, and said action will take place with less torque applied to turning about said axis in one direction than turning about said axis in the other direction.

2. In a predetermined torque release hand tool as in claim 1 wherein said interlocking means permits relative rotary movement between said cam and member, to prevent back turning of the member provided with the work engaging means when the plunger rides over the high point of the cam without rotating the cam.

3. In a predetermined torque release hand tool as in claim 1 wherein said one member is a shaft and said cam has a hub with a bore receiving the shaft, and said interlocking means comprises a laterally extending pin in said shaft and slots in said hub of a dimension to permit limited relative rotation of said shaft and cam.

4. In a predetermined torque release hand tool as in claim 1 wherein said cam is provided with a plurality of cam surfaces located about said common axis.

5. In a predetermined torque release hand tool as in claim 4 wherein said surfaces are symmetrically located about said axis.

6. In a predetermined torque release hand tool, a cylindrical body member, a shaft member rotatably mounted within said body member co-axial therewith, a cam within said body member encircling said shaft member and secured thereto, a tubular handle extending radially of said body member at right angles to its axis and in the plane of said cam, a plunger in said tubular handle, a spring urging said plunger against said cam with a force sufficient to turn the cam until a predetermined resistance is encountered and then to flex to permit said plunger to ride over the high points of said cam, said cam surface increasing radially arcuately more gradually in one direction than in the other direction, whereby with the same spring tension, slippage of the plunger over the cam will occur in one direction of rotation with less pressure applied than in the other direction of rotation about said common axis.

7. In a predetermined torque release hand tool as in claim 6 wherein said shaft member has a pin extending laterally and said cam has slots to receive said pin, said slots being of a dimension to permit limited relative rotation of said cam and shaft.

References Cited in the file of this patent
UNITED STATES PATENTS

| | | |
|---|---|---|
| 2,250,736 | Torresen | July 29, 1941 |
| 2,601,044 | Mayer | June 17, 1952 |
| 2,601,799 | Garwood | July 1, 1952 |
| 2,768,547 | Noell | Oct. 30, 1956 |
| 2,826,107 | Woods | Mar. 11, 1958 |
| 2,912,889 | Cornwell | Nov. 17, 1959 |
| 2,918,834 | Cranford | Dec. 29, 1959 |

FOREIGN PATENTS

| | | |
|---|---|---|
| 1,026,297 | France | Feb. 4, 1953 |